3,284,365
PAINT STRIPPING COMPOSITIONS
AND PROCESS
George P. Bourean, Detroit, Mich., and James E. Maloney, St. Paul, Minn., assignors to Detrex Chemical Industries Inc., Detroit, Mich., a corporation of Michigan
No Drawing. Filed Jan. 31, 1964, Ser. No. 341,766
9 Claims. (Cl. 252—156)

This invention relates to improvements in compositions for the removal of paint from painted surfaces. More particularly it relates to such compositions useful in the "caustic stripping" of paints from metallic surfaces.

This application is a continuation-in-part application of our copending application Serial No. 110,326, filed May 16, 1961, now abandoned.

It is known in the art of metal finishing to remove applied surface coatings such as paints, enamels, japans, lacquers and the like, when necessary, by the application thereto of liquid compositions containing caustic alkali compounds as a major ingredient thereof at elevated temperatures; allowing said compositions to remain in contact with the coating being removed for a sufficient time to loosen the coating; and then mechanically removing the loosened coating from the surface by liquid sprays, soaking and similar procedures. It is also known to add certain adjuvants to these "stripping" compositions such as for example phenolic compounds, non-aromatic polyhydroxy compounds, and polyhydroxy aromatic carboxylic acid compounds. In addition, it is common practice to add other components to these stripping compositions such as gluconic acid and derivatives thereof for pigment removal, sequestrants, dust allaying agents and compatible surfactants.

Recent improvements in surface coating formulations have resulted in coatings which are much more satisfactory than prior coating materials with respect to weather resistance, fade resistance and general permanency. These improved coatings, however, have proved far more difficult to remove from coated surfaces which are rejected during the production thereof and undergoing salvage by a paint stripping operation. The cost of salvaging such rejected work is thereby greatly increased, to the extent that in some cases manufacturers are faced with the choice of passing substandard parts or writing off the work invested in perfectly good parts, which may be unacceptable merely because of a poorly applied coating. This problem is particularly serious in the case of the acrylic and epoxide based paints now in susbtantial use. This problem of removing improved surface coatings is also involved in the maintenance of the paint hooks, racks, grates, etc., utilized in the application of surface coatings.

Recently, however, certain new chemical additives have been found to enhance and accelerate the paint stripping characteristics of these earlier developed compositions. Included among these newer additives are the substituted phenolic compounds such as orthophenyl phenol, chlorinated phenols, chlorinated phenyl phenols and chlorinated diphenols. A typical example of such a paint stripping composition for use in dilute aqueous solution and containing a newer additive is as follows (parts being expressed as percent by weight):

| | |
|---|---|
| Sodium hydroxide | 80 |
| Sodium gluconate | 9 |
| O-phenol phenol | 10 |
| Sodium dodecyldiphenyloxide disulfonate | 1 |
| Total | 100 |

These just described paint stripping compositions have improved the stripping rate of caustic based stripping solutions to the extent that they will now satisfy most industrial requirements. However, the majority of these additives, since they are in the phenolic class of compounds are becoming undesirable in view of the fact that they create a waste disposal problem of proportions such that many communities will not allow phenolic bodies to be dumped into water sewage because of the consequent effect on stream pollution and water purification. For example, no industrial or commercial type waste may be discharged into the Detroit, Michigan, sewer system which contains phenols in excess of 0.005 p.p.m.

It is therefore an object of this invention to provide improved compositions for effecting the "caustic stripping" of surface coatings from metallic surfaces other than aluminum and zinc.

It is another object of this invention to provide such compositions which are effective within very short treatment times.

It is another object of this invention to provide such compositions which are commercially effective on all currently used surface coatings.

It is another object of this invention to provide such compositions whereby during the application thereof, the active components of the compositions will not be distilled from the compositions.

It is another object of this invention to provide such compositions whereby the use of phenolic type additives is avoided.

Other objects and advantages of this invention will readily become apparent from a reading of the following description and claims.

It has now been discovered that the stripping rates of caustic based paint stripping compositions may be greatly enhanced, without the use of phenolic type compounds, by incorporating into said compositions a minor proportion of certain halogenated organic acids. Among those compounds which function satisfactorily to provide the compositions of this invention are the halogenated aromatic carboxylic acids having the general formula

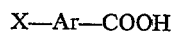

where X represents a mono- or poly-ring substituted halogen radical upon Ar, which represents an aryl radical; the halogenated aromatic sulfonic acids having the general formula X—Ar—SO$_3$H, where X represents a mono- or poly-ring substituted halogen radical upon Ar, which represents an aryl radical; the halogenated nitro substituted sulfonic acids having the general formula

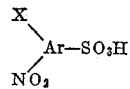

where X represents a mono- or poly-ring substituted halogen radical upon Ar, which represents an aryl radical; and the halogenated aromatic-aliphatic ether compounds having the general formula

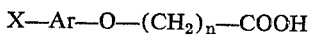

where X represents a mono- or poly-ring substituted halogen radical upon Ar, which represents an aryl radical, and $n$ represents a whole integer from 1 to 4.

An effective caustic based stripping composition in accordance with this invention may be formulated as follows (parts being expressed as percent by weight of an undiluted composition):

| | |
|---|---|
| Caustic alkali | 95.0–75.0 |
| Halogenated organic acid | 5.0–25.0 |
| Total | 100–100 |

The compositions of this invention are normally solid, and are diluted with water to the extent desired, and preferably at a concentration of at least about five percent solid composition per total weight of the dilute solution. Maximum concentrations are dependent only on solubility and economic factors. The improved halogenated organic acid containing compositions of this invention are superior to former caustic based compositions at all temperatures of use, but are most efficient when utilized at a boiling temperature.

The following examples are illustrative of the compositions of this invention.

*Example 1*

A steel panel was coated with one coat of a yellow phenolic coating (Detrex FF–100) and bake finished. The panel was partially submerged in a beaker containing a boiling aqueous caustic solution comprising sodium hydroxide at a concentration of two pounds per gallon of solution. After approximately fifteen minutes the coating was completely removed from the panel, however a residue was left on the panel.

*Example 2*

A steel panel coated in accordance with the specifications of Example 1 was partially submerged in a beaker containing a boiling two pound per gallon solution in water of a stripping composition having the following composition (parts being expressed as percent by weight of the undissolved ingredients):

| | |
|---|---:|
| Sodium hydroxide | 90 |
| 2,4-dichlorophenoxyacetic acid | 10 |
| Total | 100 |

The time required to completely strip the coating from the submerged portion of the panel was approximately two minutes, and no residue remained after rinsing.

*Example 3*

A steel panel coated in accordance with the specifications of Example 1 was partially submerged in a beaker containing a boiling two pound per gallon solution in water of a stripping composition having the following composition (parts being expressed as percent by weight of the undissolved ingredients):

| | |
|---|---:|
| Sodium hydroxide | 90 |
| 3,4-dichlorobenzoic acid | 10 |
| Total | 100 |

The time required to completely strip the coating from the submerged portion of the panel was approximately three minutes, and no residue remained after rinsing.

*Example 4*

A steel panel was coated with one coat of a black enamel (Chrysler, DRE 9201, Detzler) and bake finished. The panel was partially submerged in a beaker containing a boiling aqueous caustic solution comprising sodium hydroxide at a concentration of two pounds per gallon of solution. It required approximately sixteen minutes to completely remove the coating from the submerged portion of the panel.

*Example 5*

A steel panel coated in accordance with the specifications of Example 4 was partially submerged in a beaker containing a boiling two pound per gallon solution in water of a stripping composition having the following composition (parts being expressed as percent by weight of the undissolved ingredients):

| | |
|---|---:|
| Sodium hydroxide | 90 |
| 2,4-dichlorophenoxyacetic acid | 10 |
| Total | 100 |

The time required to completely strip the coating from the submerged portion of the panel was approximately three minutes.

*Example 6*

A steel panel coated in accordance with the specifications of Example 4 was partially submerged in a beaker containing a boiling two pound per gallon solution in water of a stripping composition having the following composition (parts being expressed as percent by weight of the undissolved ingredients):

| | |
|---|---:|
| Sodium hydroxide | 90 |
| 3,4-dichlorobenzoic acid | 10 |
| Total | 100 |

The time required to completely strip the coating from the submerged portion of the panel was approximately three minutes.

The stripping compositions of this invention containing halogenated organic acid compounds may be utilized together with the above-described known components in the improved caustic based stripping compositions in approximate amounts as shown in the following table (parts being expressed as percent by weight of an undiluted composition):

| | |
|---|---:|
| Caustic alkali | 89.5– 63.0 |
| Sodium gluconate | 5.0– 10.0 |
| Sodium dodecyldiphenyloxide disulfonate | 0.5– 2.0 |
| Halogenated organic acid | 5.0– 25.0 |
| Total | 100.0–100.0 |

The sodium dodecyldiphenyloxide disulfonate is present as a preferred surfactant, yet it may be replaced proportionately by other compatible stable detergents. The sodium gluconate is present as a sequestrant, and may be replaced proportionately by other sequestering agents such as polyphosphate compounds, for example.

The following examples are illustrative of effective compositions containing such additional adjuvants:

*Example 7*

Two steel panels were each coated with two coats of an epoxide based paint and bake finished. One panel was partially submerged in a beaker containing a boiling aqueous caustic solution comprising sodium hydroxide at a concentration of one pound per gallon of solution, and the other panel was partially submerged in a beaker containing a similar caustic solution having a sodium hydroxide concentration of two pounds per gallon. The less highly concentrated solution required eighty minutes to poorly strip the paint from the panel, and the more highly concentrated solution required only 35 minutes to strip the paint from the panel, but left a primer residue on the panel.

*Example 8*

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---:|
| Sodium hydroxide | 85 |
| Sodium gluconate | 8 |
| Sodium dodecyldiphenyloxide disulfonate | 2 |
| p-Chlorobenzoic acid | 5 |
| Total | 100 |

The time required to completely strip the paint coating from the submerged portion of the panel in the beaker containing the one pound per gallon solution was 60 minutes, and the time required for the two pound per gallon solution was 25 minutes.

Example 9

Two panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Sodium hydroxide | 80 |
| Sodium gluconate | 8 |
| Sodium dodecyldiphenyloxide disulfonate | 2 |
| p-Chlorobenzoic acid | 10 |
| Total | 100 |

The time required to completely strip the paint coating from the submerged portion of the panel in the beaker containing the one pound per gallon solution was 55 minutes, and the time required for the two pound gallon solution was 25 minutes.

Example 10

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Sodium hydroxide | 85 |
| Sodium gluconate | 8 |
| Sodium dodecyldiphenyloxide disulfonate | 2 |
| 2,4-dichlorobenzoic acid | 5 |
| Total | 100 |

The time required to completely strip the paint coating from the submerged portion of the panel in the beaker containing the one pound per gallon solution was 65 minutes, and the time required for the two pound per gallon solution was 16 minutes.

Example 11

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Sodium hydroxide | 80 |
| Sodium gluconate | 8 |
| Sodium dodecyldiphenyloxide disulfonate | 2 |
| 2,4-dichlorobenzoic acid | 10 |
| Total | 100 |

The time required to completely strip the paint coating from the submerged portion of the panel in the beaker containing the one pound per gallon solution was 48 minutes, and the time required for the two pound per gallon solution was 8 minutes.

Example 12

A steel panel, coated in accordance with the specifications of Example 7, was partially submerged in a beaker containing a two pound per gallon concentration in water of a boiling stripping composition having the following composition (parts being expressed as percent by weight of the undissolved ingredients):

| | |
|---|---|
| Sodium hydroxide | 75 |
| Sodium gluconate | 8 |
| Sodium dodecyldiphenyloxide disulfonate | 2 |
| 2,4-dichlorobenzoic acid | 15 |
| Total | 100 |

The paint coating was completely stripped from the submerged portion of the panel in six minutes.

Example 13

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Sodium hydroxide | 85 |
| Sodium gluconate | 8 |
| Sodium dodecyldiphenyloxide disulfonate | 2 |
| 3,4-dichlorobenzoic acid | 5 |
| Total | 100 |

The time required to completely strip the paint coating from the submerged portion of the panel in the beaker containing the one pound per gallon solution was 40 minutes, and the time required for the two pound per gallon solution was 10 minutes.

Example 14

Two steel panels, coated in accordance with the specifications of Example 7, were partially submerged in beakers containing respectively one and two pound per gallon concentrations in water of a boiling stripping composition having the following composition (parts expressed as percent by weight of the undissolved ingredients):

| | |
|---|---|
| Sodium hydroxide | 80 |
| Sodium gluconate | 8 |
| Sodium dodecyldiphenyloxide disulfonate | 2 |
| 3,4-dichlorobenzoic acid | 10 |
| Total | 100 |

The time required to completely strip the paint coating from the submerged portion of the panel in the beaker containing the one pound per gallon solution was 33 minutes, and the time required for the two pound per gallon solution was 6 minutes.

Example 15

A steel panel, coated in accordance with the specifications of Example 7, was partially submerged in a beaker containing a two pound per gallon concentration in water of a boiling stripping composition having the following composition (parts being expressed as percent by weight of the undissolved ingredients):

| | |
|---|---|
| Sodium hydroxide | 75 |
| Sodium gluconate | 8 |
| Sodium dodecyldiphenyloxide disulfonate | 2 |
| 3,4-dichlorobenzoic acid | 15 |
| Total | 100 |

The paint coating was completely stripped from the submerged portion of the panel in five minutes.

Example 16

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Potassium hydroxide | 85 |
| Sodium gluconate | 8 |
| Sodium dodecyldiphenyloxide disulfonate | 2 |
| 2,4-dichlorophenoxyacetic acid | 5 |
| Total | 100 |

The time required to completely strip the paint coating from the submerged portion of the panel in the beaker containing the one pound per gallon solution was 60 minutes, and the time required for the two pound per gallon solution was 10 minutes.

*Example 17*

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Potassium hydroxide | 80 |
| Sodium gluconate | 8 |
| Sodium dodecyldiphenyloxide disulfonate | 2 |
| 2,4-dichlorophenoxyacetic acid | 10 |
| Total | 100 |

The time required to completely strip the paint coating from the submerged portion of the panel in the beaker containing the one pound per gallon solution was 60 minutes, and the time required for the two pound per gallon solution was 6 minutes.

*Example 18*

A steel panel, coated in accordance with the specifications of Example 7, was partially submerged in a beaker containing a two pound per gallon concentration in water of a boiling stripping composition having the following composition (parts being expressed as percent by weight of the undissolved ingredients):

| | |
|---|---|
| Potassium hydroxide | 75 |
| Sodium gluconate | 8 |
| Sodium dodecyldiphenyloxide disulfonate | 2 |
| 2,4-dichlorophenoxyacetic acid | 15 |
| Total | 100 |

The paint coating was completely stripped from the submerged portion of the panel in five minutes.

*Example 19*

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Potassium hydroxide | 85 |
| Sodium gluconate | 8 |
| Sodium dodecyldiphenyloxide disulfonate | 2 |
| 2,4,5-trichlorophenoxyacetic acid | [1] 5 |
| Total | 100 |

[1] Max. solubility 2–3%.

The time required to completely strip the paint coating from the submerged portion of the panel in the beaker containing the one pound per gallon solution was 55 minutes, and the time required for the two pound per gallon solution was 25 minutes.

*Example 20*

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Sodium hydroxide | 85 |
| Sodium gluconate | 8 |
| Sodium dodecyldiphenyloxide disulfonate | 2 |
| p-Chlorobenzenesulfonic acid | 5 |
| Total | 100 |

The time required to completely strip the paint coating from the submerged portion of the panel in the beaker containing the one pound per gallon solution was 63 minutes, and the time required for the two pound per gallon solution was 20 minutes.

*Example 21*

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Sodium hydroxide | 80 |
| Sodium gluconate | 8 |
| Sodium dodecyldiphenyloxide disulfonate | 2 |
| p-Chlorobenzenesulfonic acid | 10 |
| Total | 100 |

The time required to completely strip the paint coating from the submerged portion of the panel in the beaker containing the one pound per gallon solution was 32 minutes, and the time required for the two pound per gallon solution was 16 minutes.

*Example 22*

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Sodium hydroxide | 85 |
| Sodium gluconate | 8 |
| Sodium dodecyldiphenyloxide disulfonate | 2 |
| 2-chloro-5-nitrobenzenesulfonic acid | 5 |
| Total | 100 |

The time required to completely strip the paint coating from the submerged portion of the panel in the beaker containing the one pound per gallon solution was 60 minutes, and the time required for the two pound per gallon solution was 35 minutes.

*Example 23*

Two steel panels, coated in accordance with the specifications of Example 7, were partially submerged in beakers containing respectively one and two pound per gallon concentrations in water of a boiling stripping composition having the following composition (parts being expressed as percent by weight of the undissolved ingredients):

| | |
|---|---|
| Sodium hydroxide | 80 |
| Sodium gluconate | 8 |
| Sodium dodecyldiphenyloxide disulfonate | 2 |
| 2-chloro-5-nitrobenzenesulfonic acid | 10 |
| Total | 100 |

The time required to completely strip the paint coating from the submerged portion of the panel in the beaker containing the one pound per gallon solution was 50 minutes, and the time required for the two pound per gallon solution was 19 minutes.

The halogenated organic acids utilized in the compositions of this invention are preferably added at a concentration of about ten percent solids, although a range of from about five to about fifteen percent solids is effective, and concentrations above about fifteen percent solids effective but not currently economically feasible.

Having thus described our invention, we claim:

1. A solid paint stripping composition for use in dilute aqueous solution consisting essentially of a major amount of a caustic alkali metal compound selected from the class consisting of sodium and potassium hydroxide, and an amount in the range of from about five percent by weight to about forty percent by weight of a halogenated organic acid compound selected from the group consisting of the halogenated aromatic carboxylic acids having the general formula X—Ar—COOH, where X represents a ring substituted halogen radical upon Ar, which represents a phenyl radical; the halogenated aromatic sulfonic acids having the general formula X—Ar—SO₃H, where X represents a radical selected from the group consisting of mono- and poly-ring substituted halogen radical upon Ar, which represents a phenyl radical; the halogenated nitro substituted sulfonic acids having the general formula

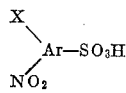

where X represents a radical selected from the group consisting of mono- and poly-ring substituted halogen radical upon Ar, which represents a phenyl radical; and a halogenated aromatic-aliphatic ether compound selected from the class consisting of 2,4-dichlorophenoxyacetic acid and 2,4,5-trichlorophenoxyacetic acid.

2. The composition of claim 1 wherein the halogenated organic acid compound is p-chlorobenzoic acid.

3. The composition of claim 1 wherein the halogenated organic acid compound is 2,4-dichlorobenzoic acid.

4. The composition of claim 1 wherein the halogenated organic acid compound is 3,4-dichlorobenzoic acid.

5. The composition of claim 1 wherein the halogenated organic acid compound is 2,4-dichlorophenoxyacetic acid.

6. The composition of claim 1 wherein the halogenated organic acid compound is 2,4,5-trichlorophenoxyacetic acid.

7. The composition of claim 1 wherein the halogenated organic acid compound is p-chlorobenzenesulfonic acid.

8. The composition of claim 1 wherein the halogenated organic acid compound is 2-chloro-5-nitrobenzene-sulfonic acid.

9. The composition of claim 1 containing additionally sodium dodecyldiphenyloxide disulfonate in an amount in the range of from about 0.5 percent to about 0.2 percent by weight of said composition.

References Cited by the Examiner

UNITED STATES PATENTS

| | | | |
|---|---|---|---|
| 1,095,793 | 5/1914 | Bohn | 252—156 |
| 1,742,347 | 1/1930 | Fries | 252—143 |
| 2,314,285 | 3/1943 | Morgan | 252—156 XR |
| 2,962,395 | 11/1960 | Brown | 252—156 XR |
| 2,969,328 | 1/1961 | Ellenson et al. | 252—153 |
| 2,971,918 | 2/1961 | Goldsmith et al. | 252—156 XR |
| 2,975,140 | 3/1961 | Yaroch | 252—156 XR |
| 3,027,223 | 3/1962 | Teot | 252—156 XR |
| 3,106,929 | 10/1963 | Friedrich | 134—38 |
| 3,203,787 | 8/1965 | Grunwold | 252—156 XR |

OTHER REFERENCES

The Condensed Chem. Dict., Reinhold Publ. Corp., 6th ed., 1961, pp. 332 and 1162 relied on.

LEON D. ROSDOL, *Primary Examiner.*

ALBERT T. MEYERS, JULIUS GREENWALD,
*Examiners.*

W. E. SCHULZ, *Assistant Examiner.*